(12) United States Patent
Schmidt et al.

(10) Patent No.: US 11,167,521 B2
(45) Date of Patent: Nov. 9, 2021

(54) DECORATIVE MOLDED PART

(71) Applicant: QUIN GmbH, Rutesheim (DE)

(72) Inventors: Martin Schmidt, Gerabronn (DE); Claudia Wengert, Pforzheim (DE)

(73) Assignee: Joysonquin Automotive Systems GMBH, Rutesheim (DE)

( * ) Notice: Subject to any disclaimer, the term of this patent is extended or adjusted under 35 U.S.C. 154(b) by 7 days.

(21) Appl. No.: 16/706,894

(22) Filed: Dec. 9, 2019

(65) Prior Publication Data

US 2020/0189225 A1 Jun. 18, 2020

(30) Foreign Application Priority Data

Dec. 13, 2018 (DE) .......................... 102018221678.9

(51) Int. Cl.
| | | |
|---|---|---|
| *B32B 3/14* | (2006.01) | |
| *B32B 15/10* | (2006.01) | |
| *B32B 15/20* | (2006.01) | |
| *B32B 3/08* | (2006.01) | |
| *B32B 15/08* | (2006.01) | |

(52) U.S. Cl.
CPC ............... *B32B 3/14* (2013.01); *B32B 3/085* (2013.01); *B32B 15/08* (2013.01); *B32B 15/10* (2013.01); *B32B 15/20* (2013.01); *B32B 2307/732* (2013.01); *B32B 2451/00* (2013.01);
(Continued)

(58) Field of Classification Search
CPC .......... B32B 3/14; B32B 15/08; B32B 3/085; B32B 15/10; B32B 15/20; B32B 2307/732; B32B 2451/00; B32B 2605/003; B32B 1/00; B32B 3/18; B32B 3/22; Y10T 428/24975; Y10T 428/22; B60R 13/02; B60R 13/04
See application file for complete search history.

(56) References Cited

U.S. PATENT DOCUMENTS 3,616,099 A * 10/1971 Shanok ................... B32B 3/04
428/76
2006/0121251 A1 6/2006 Oberacher et al. ........... 428/172

FOREIGN PATENT DOCUMENTS

DE 4122412 A1 1/1993
DE 4124297 A1 1/1993
(Continued)

OTHER PUBLICATIONS

[NPL-1] Wengert (DE 102012016147 A1); Mar. 13, 2014 (EPO machine translation to English). (Year: 2014).*
(Continued)

*Primary Examiner* — Frank J Vineis
*Assistant Examiner* — Donald M Flores, Jr.
(74) *Attorney, Agent, or Firm* — Fattibene and Fattibene LLC; Paul A. Fattibene

(57) ABSTRACT

Decorative molded part with a support, on the front side facing a visible side of the decorative molded part of which a first and a second decorative layer are arranged side by side, the first decorative layer being applied to the support as a continuous layer and the second decorative layer being applied to the first decorative layer. A decorative molded part of the type mentioned above with a special aesthetic appearance is provided by the fact that the second decorative layer is made of a wood veneer and the first decorative layer is made of a metal foil and that the second decorative layer is pressed into the first decorative layer.

13 Claims, 1 Drawing Sheet

(52) U.S. Cl.
CPC ....... *B32B 2605/003* (2013.01); *Y10T 428/22* (2015.01); *Y10T 428/24975* (2015.01)

(56) References Cited

FOREIGN PATENT DOCUMENTS

| | | | |
|---|---|---|---|
| DE | 4301444 | 7/1994 | |
| DE | 10 2012 016 147 | 3/2014 | |
| DE | 102012016147 A1 * | 3/2014 | ............... B32B 9/04 |
| JP | 3030922 A | 2/1991 | |
| WO | WO 2014/000524 | 12/2003 | |
| WO | WO 2017/009152 | 1/2017 | |

OTHER PUBLICATIONS

English translation of Office Action in counterpart German Application No. 10 2018 221 678.9, dated Sep. 27, 2019; 3 pages.

* cited by examiner

DECORATIVE MOLDED PART

FIELD OF THE INVENTION

The present invention concerns a decorative molded part with a support, on the front side facing a visible side of the decorative molded part of which a first and a second decorative layer are arranged side by side, the first decorative layer being applied to the support as a continuous layer and the second decorative layer being applied to the first decorative layer.

BACKGROUND OF THE INVENTION

Such a decorative molded part is known from DE 10 2012 016 147 A1.

Lining parts in this sense can be, for example, inserts in dashboards, covers for the center con-sole as well as covers, decorative molded parts or flaps, for example, of ashtrays inside the side doors.

A method for producing a decorative molded part of the type mentioned above is known from JP 30-30922 A. With this prior art, the rear reinforcement layer is formed by injection molding around a backside of a veneer layer with basically any plastic material. Accordingly, a transparent cover is formed on the visible side by overmolding. The transparent cover can also be colored. Usually, the decorative molded part is produced by two-component injection molding on an indexing tool. In one station, the reinforcement layer is injected on the back side of the veneer layer, while at the same time the transparent cover on the visible side of the veneer layer is injected as the last working step in the two-component injection mold.

In addition to the prior art presented above, the applicant refers to DE 43 01 444 C2, DE 41 24 297 A1 and DE 41 22 412 A1 as relevant prior art.

Lining parts in motor vehicles must meet very high aesthetic requirements. The decorative molded parts must match the highly technical and aesthetic features of the vehicle. The aim is also to aesthetically design the visible side in a special way.

For example, from WO 2004/00524 a method is known in which a first decorative layer is formed from a metal foil to which a printed pattern is applied. By injection molding around a backside of the foil, the foil is applied to a mold cavity surface into which the printed film has previously been inserted. The film is applied against the surface by the injection pressure of the plastic material forming the support and thus surrounds the printed surface elements of the second decorative layer.

With the state of the art known from DE 10 2012 016 147, a harder material is placed on a continuous layer of a softer material, which can be formed by a veneer layer. The harder layer is formed by a metal.

The underlying problem of the present invention is to form an aesthetically appealing decorative molded part.

SUMMARY OF THE INVENTION

To solve this problem, the present invention provides a decorative molded part according to an embodiment of the present invention.

Preferred developments are provided in other embodiments.

The first layer of the decorative molded part according to the invention is applied to the support as a continuous layer. The first layer is made of a harder material than the second layer. According to the invention, the first layer is made of a metal foil. The second decorative layer is made of a wood veneer. Unexpectedly, it has been shown that by applying an injection pressure during the formation of the support, the harder material layer can be deformed by the softer layer by forming around it circumferentially, resulting in a decorative molded part in which the surface elements of the second decorative layer are circumferentially surrounded by the surface elements of the first decorative layer and both surface elements are essentially at the same height on the visible side of the decorative molded part.

Thus, the present invention provides an aesthetically appealing decorative part.

The preferred configuration of the present invention offers a particularly appealing visual image, in which the visible surface of the decorative molded part is formed by surface portions of the first and second decorative layers. Preferably, the visible surface of the molded decorative part is formed solely by the elements of the first and second decorative layers. These are exposed on the visible surface of the decorative molded part. In other words, the surface portions of the first and second decorative layers are not covered by a visible coating. The surface of the decorative molded part therefore appears particularly aesthetic and organic. The wood veneer directly forms the surface of the decorative molded part.

According to a preferred further development of the present invention, the first decorative layer has a surface portion of between 45% and 55% of the visible surface. The remaining visible surface is formed by the second decorative layer. With this configuration, the surface portions of the wood veneer and the surface portions of the metal foil are approximately of the same size.

In an alternative configuration, the first decorative layer has a surface portion of between 15% and 35% of the visible surface. The remaining visible surface is formed by the second decorative layer.

In another alternative configuration, in which the decorative molded part can be configured in the manner of a ship deck with elongated parallel strips of wooden segments with intermediate spacer strips, the surface portion of the veneer is over 97%, preferably around 99%, and the aluminum strip occupies the rest of the surface. The aluminum strips are formed oblong and run essentially parallel to each other. The same applies to the veneer strips. The aluminum strips can also be configured to follow an external contour of the decorative molded part. However, in this case, as well, all aluminum strips are preferred to extend essentially parallel to each other.

BRIEF DESCRIPTION OF THE DRAWINGS

Further details and advantages of the present invention result from the following description of an embodiment in connection with the drawing, which illustrates in schematic side views the production of an embodiment in different stages, wherein.

DETAILED DESCRIPTION OF THE INVENTION

Figure 1:
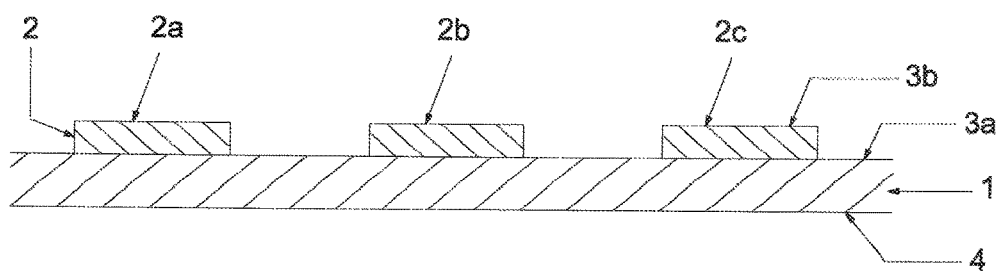
FIG. 1 shows a longitudinal sectional view of the embodiment after a second decorative layer has been applied to a first decorative layer and FIG. 2 shows a view according to FIG. 1 after the application of a rear reinforcement layer against the first decorative layer.

FIG. 1 shows a cross-sectional view of a first decorative layer 1, which presently is formed as a metal foil with a thickness of between 0.05 and 0.3 mm, preferably 0.09 and 0.11 mm, in particular 0.1 mm. The first decorative layer was formed by cutting and calibrated to the said thickness, if necessary brought to measure or provided with supporting holes, in order to position and hold the first decorative layer 1 on pins of an injection mold. It may be possible to transform the first decorative layer 1 into a three-dimensional preform by applying pressure and temperature, for example to produce a slight contour on the visible side and/or a circumferential edge in the outer zones of the decorative layer 1. The first decorative layer 1 can also be sprayed with a stain or shot-blasted/surface-treated.

A second decorative layer 2 of a wood veneer is placed on top of this first decorative layer 1. The second decorative layer has a thickness of between 0.1 and 0.5 mm, preferably 0.22 and 0.28 mm, in particular 0.25 mm. Presently, the second decorative layer 2 has several separate island-shaped decorative elements 2a, 2b, and 2c which are each provided independently and without connection to each other. These individual decorative elements 2a, 2b, and 2c are each provided with a lamination on the back side facing the first decorative layer 1, via which the decorative elements 2a, 2b, and 2c are bonded to the first decorative layer 1. In this way, the intermediate product shown in FIG. 1 is prepared, placed in a mold half of an injection mold and positioned there. A visible side 3a of the first decorative layer 1 or 3b of the second decorative layer 2 abuts a surface of the injection mold limiting the cavity, whereas a back side 4, which is formed exclusively by the first decorative layer 1, is exposed to the mold cavity. A plastic component is now injected into the mold cavity which forms a reinforcement layer 5 on the back side 4 of the first decorative layer 1. By injection molding around a backside of the reinforcement layer 5, it is connected to the back side 4 of the first decorative layer.

Figure 2:
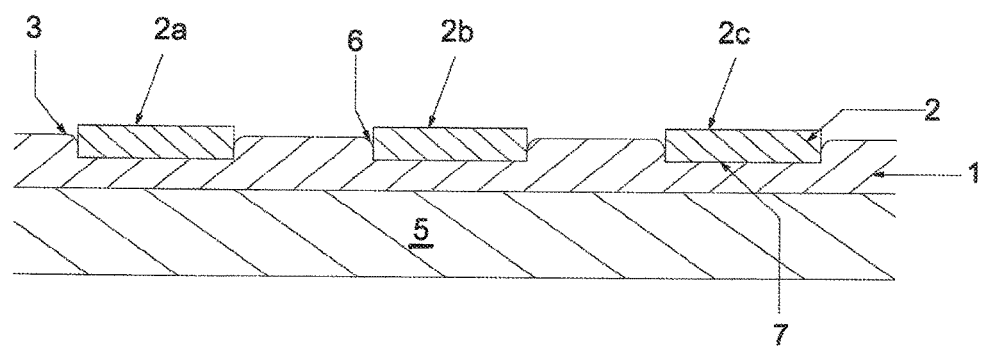

The intermediate product shown in FIG. 1 is compressed due to the effective injection pressure and the holding pressure during solidification of the plastic component. The decorative elements 2a, 2b, and 2c of the second decorative layer 2 press into the first decorative layer 1, as shown in FIG. 2. In the embodiment shown, the decorative elements 2a, 2b, and 2c of the second decorative layer 2 are on one level with the visible surface 3 of the first decorative layer 1. By pressing the second decorative layer 2 into the first decorative layer 1, the first decorative layer is circumferentially formed around the surface elements of the second decorative layer. On the visible surface of the product shown in FIG. 2, the first decorative layer and the second decorative layer 1 are exposed. Thus, the surfaces of the wood veneer elements forming the second decorative layer 2 are also provided to be exposed on the surface of the decorative molded part.

The rear injection molding in the form of the reinforcement layer 5 can form or have functional elements for fastening the decorative molded part to a chassis of a motor vehicle.

Afterwards, the further intermediate product shown in FIG. 2 is usually converted in an indexing tool in order to apply a coating on the visible side 3a, 3b, presently by overmolding the visible side 3a, 3b with a transparent thermoplastic such as PMMA. This overmolding may lead to a further compression of the decoration formed from the first and second decorative layers 1 and 2, particularly, if the first decorative layer 1 is much softer than the second decorative layer 2.

REFERENCE SIGN LIST 1 first decorative layer
2 second decorative layer
2a-2c decorative elements
3 visible side
3a visible side first decorative layer 1
3b visible side second decorative layer 2
4 back side
5 reinforcement layer
6 ramp
7 contact surface

What is claimed is:

1. A decorative molded part comprising:
   a support, on the front side facing a visible side of the decorative molded part of which a first and a second decorative layer are arranged side by side, the first decorative layer being applied to the support as a continuous layer and the second decorative layer being applied to the first decorative layer, wherein the second decorative layer is made of a wood veneer and the first decorative layer is made of a metal foil harder than the wood veneer, and in that the second decorative layer is pressed into the first decorative layer.

2. A decorative molded part according to claim 1, wherein a visible surface of the decorative molded part is formed by surface portions of the first and second decorative layers.

3. A decorative molded part according to claim 2, wherein the surface portions of the first decorative layer comprise between 45% and 55% of the visible surface, and remaining visible surface is formed by the surface portions of the second decorative layer.

4. A decorative molded part according to claim 3, wherein the surface portions of the second decorative layer and the surface portions of the first decorative layer have approximately the same visible surface area.

5. A decorative molded part according to claim 2, wherein the visible surface is configured in the manner of a ship deck with elongated parallel strips of the second decorative layer with intermediate spacer strips of the first decorative layer.

6. A decorative molded part according to claim 5, wherein the surface portions of the elongated parallel strips are over 97% of the visible surface, and the spacer strips occupy the rest of the visible surface.

7. A decorative molded part according to claim 6, wherein the spacer strips are formed oblong and run parallel to each other, and in that the elongated parallel strips are formed oblong and run parallel to each other.

8. A decorative molded part according to claim 1, wherein the first decorative layer is formed as the metal foil with a thickness of between 0.05 and 0.3 mm and in that the second decorative layer has a thickness of between 0.1 and 0.5 mm.

9. A decorative molded part according to claim 2, wherein the surface portions of the first decorative layer comprises between 15% and 35% of the visible surface, and a remaining visible surface is formed by the surface portions of the second decorative layer.

10. A decorative molded part according to claim 1, wherein the metal foil comprises aluminum.

11. A decorative molded part according to claim 1, wherein the first decorative layer has a thickness of between 0.05 mm and 0.11 mm and the second decorative layer has a thickness of between 0.1 mm and 0.28 mm.

12. A decorative molded part having a visible side comprising:
    a support;
    a continuous first decorative layer adjacent said support;
    a second decorative layer adjacent said continuous first decorative layer, said second decorative layer comprising a plurality of decorative elements arranged side by side;

wherein said continuous first decorative layer is made of a first material harder than a second material from which the plurality of decorative elements are made of and each of the plurality of decorative elements are pressed into said continuous first decorative layer so that said continuous first decorative layer is circumferentially formed around at least three sides of each of the plurality of decorative elements and the visible side of the decorative molded part comprises a surface of said continuous first decorative layer and a surface of said second decorative layer; and wherein said first material comprises a metal foil, and said second material comprises a wood veneer.

13. A decorative molded part having a visible side as in claim 12 wherein:

said continuous first decorative layer has a thickness of between 0.05 mm and 0.11 mm and said second decorative layer has a thickness of between 0.1 mm and 0.28 mm.

\* \* \* \* \*